UNITED STATES PATENT OFFICE.

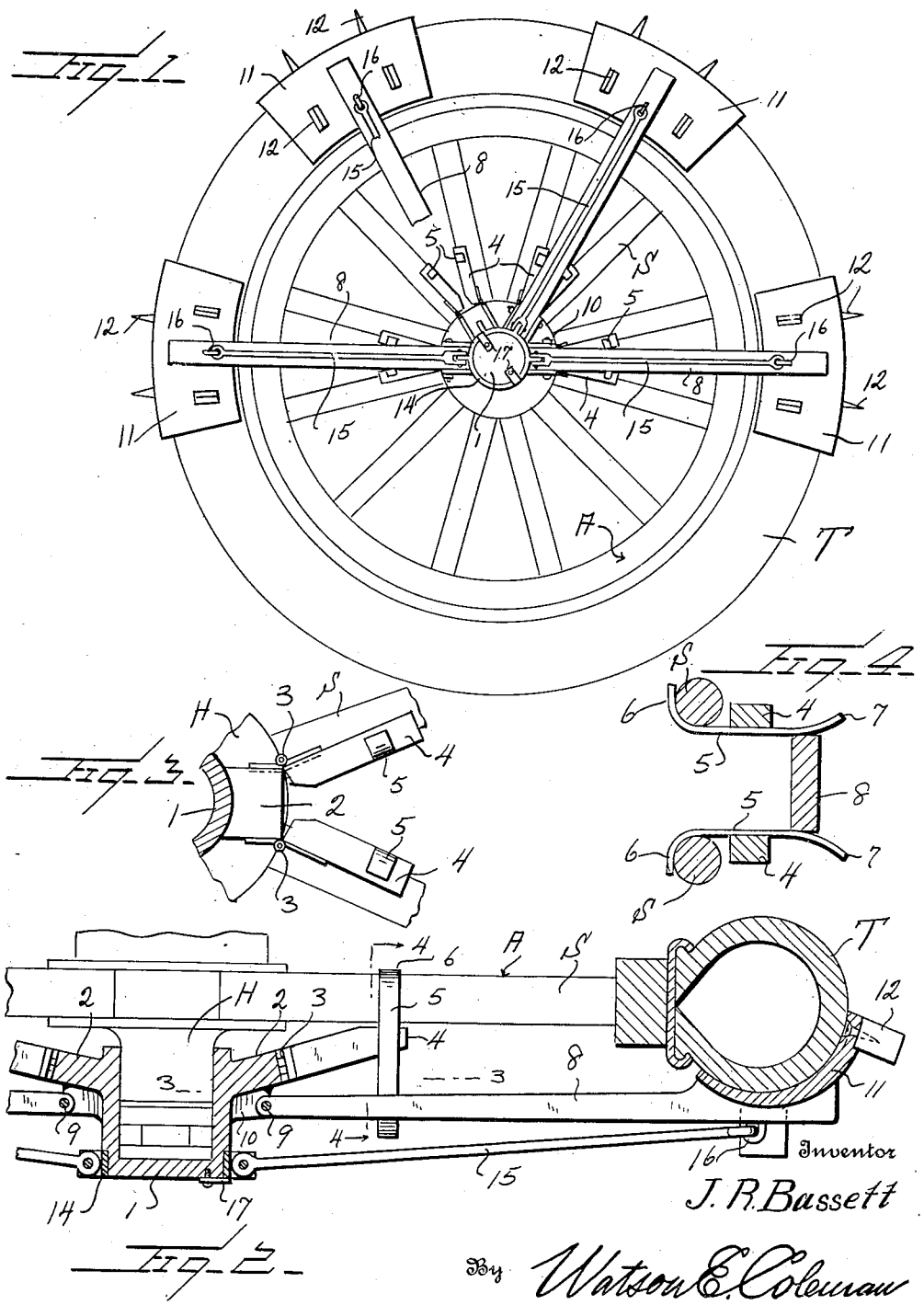

JOHN R. BASSETT, OF BLAKES, VIRGINIA.

TRACTION ATTACHMENT FOR VEHICLE-WHEELS.

1,371,462. Specification of Letters Patent. Patented Mar. 15, 1921.

Application filed June 3, 1920. Serial No. 386,237.

*To all whom it may concern:*

Be it known that I, JOHN R. BASSETT, a citizen of the United States, residing at Blakes, in the county of Mathews and State of Virginia, have invented certain new and useful Improvements in Traction Attachments for Vehicle-Wheels, of which the following is a specification, reference being had to the accompanying drawings.

This invention relates to traction attachments for vehicle wheels and it is primarily an object of the invention to provide a novel and improved attachment of this general character especially designed and adapted for use to assist or facilitate the ejecting or freeing of a wheel from ruts, mud, sand, or the like.

It is also an object of the invention to provide a novel and improved device of this general character which may be readily and conveniently applied to a wheel and particularly when said wheel is partially embedded within mud, sand, or the like.

An additional object of the invention is to provide a novel and improved device of this general character which does not require any special construction of wheel in order to use the same and which, furthermore, does not require fastening means, such as bolts or screws, in order to apply the attachment in working position.

The invention consists in the details of construction and in the combination and arrangement of the several parts of my improved traction attachment for vehicle wheels whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation of a traction attachment constructed in accordance with an embodiment of my invention and in applied position.

Fig. 2 is an enlarged fragmentary view partly in horizontal section and partly in top plan of the lower portion of the structure as illustrated in Fig. 1.

Fig. 3 is a fragmentary sectional view taken substantially on the line 3—3 of Fig. 2, and Fig. 4 is a fragmentary sectional view taken substantially on the line 4—4 of Fig. 2.

As disclosed in the accompanying drawings, A denotes a wheel structure of a type commonly employed in connection with automobiles or other vehicles and which wheel includes the hub portion H.

My improved attachment comprises a cap 1 constructed to snugly engage over the outer end portion of the hub H and substantially radiating from the cap 1 adjacent its inner or open end are the arms or lugs 2. In the present embodiment of my invention, the arms or lugs 2 are four in number and are arranged substantially at one side of the cap 1.

Hingedly connected as at 3 with the outer end portion of each of the arms or lugs 2 are the arms 4 adapted to have relative swinging movement in a direction circumferentially of the wheel structure A and it is to be understood that each of the hinges 3 is of a spring type so that the arms 4 are constantly urged inwardly or one toward the other.

The opposed faces of the arms 4 adjacent their outer ends are provided with the transversely disposed straps 5 extending beyond opposite sides of the arms. The inner end portions of the straps 5 are provided with the outwardly disposed extensions 6 affording hook members to engage adjacent spokes S of the wheel structure A. The opposite end portions of the straps 5 are outwardly curved as at 7 to facilitate passage therebetween of an elongated arm 8.

Each of the arms 8 is pivotally engaged as at 9 between a pair of lugs or plates 10 arranged at the inner end portion of the adjacent arm or lug 2. The outer end portion of the arm 8 has secured thereto a traction shoe 11 and the arm 8 is of such length to cause the shoe 11 to contact with the outer side face of the tire T comprised in the wheel structure A. The shoe 11 has extending outwardly therefrom the lugs 12 whereby the desired gripping action of the shoe is increased so that the effectiveness of the device is assured.

When the cap 1 is applied, each of the arms or lugs 2 is positioned between a pair of adjacent spokes S so that when the arm 8 is moved inwardly toward the wheel structure A to bring the shoe 11 into proper position, said arm 8 will pass between the straps 5, resulting in a separation of the arms 4 so that the hook 6 will be brought into working engagement with the spokes S and whereby the device is maintained in desired position and in a manner whereby the device or attachment is held against movement independently of the wheel structure.

14 denotes a collar adapted to be forced inwardly and around the outer end portion of the cap 1 and pivotally engaged with said collar 14 are the inner end portions of the rods 15. A rod 15 coacts with each of the arms 8 and has its outer end portion pivotally engaged as at 16 with the outer end portion of the coacting arm 8. By this arrangement, as the collar 14 is forced over the outer end of the cap 1, the shoes 11 of the arms 8 are caused to properly engage the side portions of the tire T.

In order to hold the collar 14 in applied position and against accidental displacement, the outer end of the cap 1 is provided with the swinging lugs 17 which are adapted to be thrown into a position to overlie the outer side of the applied cap 14 to hold the same against displacement.

By having the arms or lugs 2 arranged as hereinbefore referred to, it is to be particularly noted that the applied attachment does not extend entirely around the wheel. This is of decided advantage as it permits the attachment to be readily and conveniently applied even though the lower portion of the wheel be embedded in mud or sand or be set within a relatively deep rut.

From the foregoing description it is thought to be obvious that a traction attachment for vehicle wheels constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device of the character described comprising a cap adapted to engage the hub of a wheel, members substantially radiating from said cap, means carried by said members for engagement with the spokes of said wheel, a plurality of traction shoes including supporting arms, each arm being pivoted to one of the members, a collar adapted to be positioned closely adjacent the cap and holding rods pivoted at one end to each arm of the traction shoe and at their other ends to the collar.

2. A device of the character described comprising a cap adapted to engage the hub of a wheel, members carried by said cap, means carried by said brace members for engagement with the spokes of said wheel, a plurality of traction shoes, each shoe including an arm, said arm being pivoted to one of the members, a collar, and rods pivoted to the collar and to the arms, said collar being movable toward the cap to urge the traction shoes into engagement with the tire of the wheel through the medium of said arms and rods.

3. A device of the character described comprising a cap adapted to engage over the hub of a wheel, a pair of relatively movable arms carried by said cap, spoke engaging means carried by each of the arms, an arm pivotally engaged with the cap and provided with a traction shoe to engage the tire of the wheel, and means coacting with said second named arm for holding the shoe in applied position, said second named arm operating to separate the first named arm and to maintain the spoke engaging means in working position when the shoe is in applied position on the tire.

4. A device of the character described comprising a cap adapted to engage over the hub of a wheel, a pair of relatively movable arms carried by said cap, spoke engaging means carried by each of the arms, an arm pivotally engaged with the cap and provided with a traction shoe to engage the tire of the wheel, means coacting with said second named arm for holding the shoe in applied position, said second named arm operating to separate the first named arm and to maintain the spoke engaging means in working position when the shoe is in applied position on the tire, a collar engageable over the cap, and a rod operatively engaging the collar and the outer end portion of the second named arm.

5. A device of the character described comprising a cap adapted to engage over the hub of a wheel, a pair of relatively movable arms carried by said cap, spoke engaging means carried by each of the arms, an arm pivotally engaged with the cap and provided with a traction shoe to engage the tire of the wheel, means coacting with said second named arm for holding the shoe in applied position, said second named arm operating to separate the first named arm and to maintain the spoke engaging means in working position when the shoe is in applied position on the tire, a collar engageable over the cap, a rod operatively engaging the collar and the outer end portion of the second named arm, and means for holding the collar against displacement when disposed around the cap.

6. An attachment of the class described comprising a member engageable with the hub of a wheel, normally inoperative spoke engaging means carried by said member, a traction shoe adapted for engagement with the tire of a wheel, an operative connection between said traction shoe and the member, said connection coacting with the spoke engaging means to render said means operative when the shoe is in engagement with the tire, and means for holding the shoe in applied position.

In testimony whereof I hereunto affix my signature.

JOHN R. BASSETT.